(12) United States Patent
Jordan et al.

(10) Patent No.: US 12,147,339 B2
(45) Date of Patent: *Nov. 19, 2024

(54) NON-UNIFORM MEMORY INTERLEAVING PROCESSOR

(71) Applicant: SambaNova Systems, Inc., Palo Alto, CA (US)

(72) Inventors: Paul Jordan, Austin, TX (US); Manish K. Shah, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,686

(22) Filed: Jun. 7, 2023

(65) Prior Publication Data
US 2023/0315624 A1 Oct. 5, 2023

Related U.S. Application Data

(63) Continuation of application No. 18/085,340, filed on Dec. 20, 2022.
(Continued)

(51) Int. Cl.
*G06F 12/06* (2006.01)
*G06F 12/02* (2006.01)
*G06F 13/16* (2006.01)

(52) U.S. Cl.
CPC ...... *G06F 12/0607* (2013.01); *G06F 12/0238* (2013.01); *G06F 13/1668* (2013.01)

(58) Field of Classification Search
CPC ............ G06F 12/0607; G06F 12/0238; G06F 13/1668; G06F 12/0292; G06F 2212/1016
See application file for complete search history.

(56) References Cited

U.S. PATENT DOCUMENTS

2005/0144413 A1* 6/2005 Kuo .................... G06F 13/4243
711/170
2008/0320476 A1* 12/2008 Wingard .......... G06F 15/17375
718/101
(Continued)

OTHER PUBLICATIONS

Hillenbrand, Marius, et al. "Multiple physical mappings: Dynamic DRAM channel sharing and partitioning." Proceedings of the 8th Asia-Pacific Workshop on Systems. 2017. (Year: 2017).*

*Primary Examiner* — Charles Rones
*Assistant Examiner* — Hewy H Li
(74) *Attorney, Agent, or Firm* — Flagship Patents; Sikander M. Khan; Andre Henri Grouwst

(57) ABSTRACT

A processor has multiple memory interfaces and a memory interleaver controlling access to the memory interfaces. The memory interfaces may each couple with one or more memory devices. The number of memory devices coupled to the different memory interfaces may be unequal. The memory interleaver determines a memory region from a logical address, and a region relative address. It determines the interleave factor IF corresponding to the memory region. It performs an integer division to obtain a device line address, and a modulo operation to obtain an uncorrected channel address. The memory interleaver may add a region start address associated with the memory region to the device line address to obtain a physical line address. It may correct the uncorrected channel address, based on the memory region, to obtain a physical channel address. Some implementations use configuration memories to allow flexibility, other implementations are hardwired for a particular memory architecture.

16 Claims, 12 Drawing Sheets

Related U.S. Application Data

(60) Provisional application No. 63/292,251, filed on Dec. 21, 2021.

(56) References Cited

U.S. PATENT DOCUMENTS

| | | | |
|---|---|---|---|
| 2015/0100746 A1* | 4/2015 | Rychlik | G06F 12/0607 |
| | | | 711/157 |
| 2017/0109090 A1* | 4/2017 | Chun | G06F 3/0625 |
| 2019/0251034 A1* | 8/2019 | Guim Bernat | G06F 12/0888 |
| 2020/0272562 A1* | 8/2020 | La Fratta | H04W 4/029 |
| 2022/0254409 A1* | 8/2022 | Desai | G11C 11/4093 |

\* cited by examiner

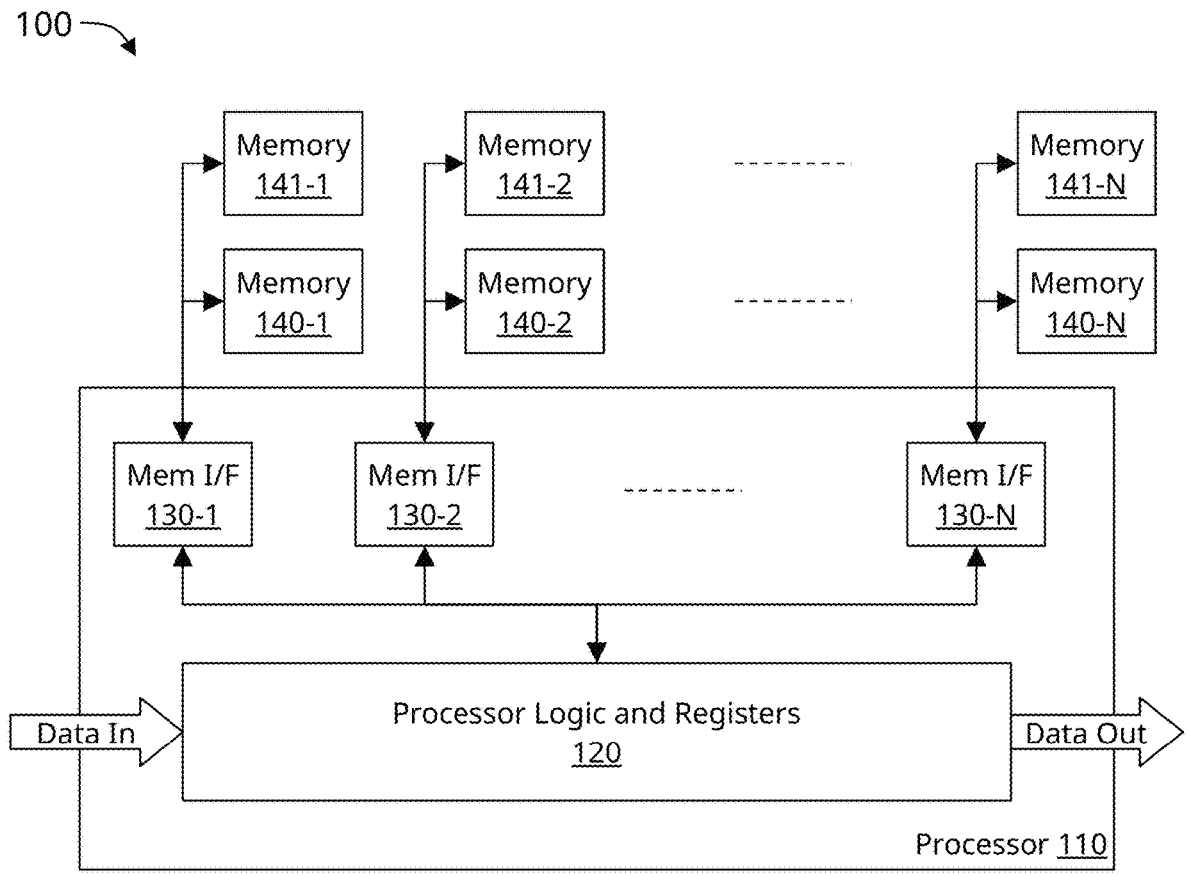
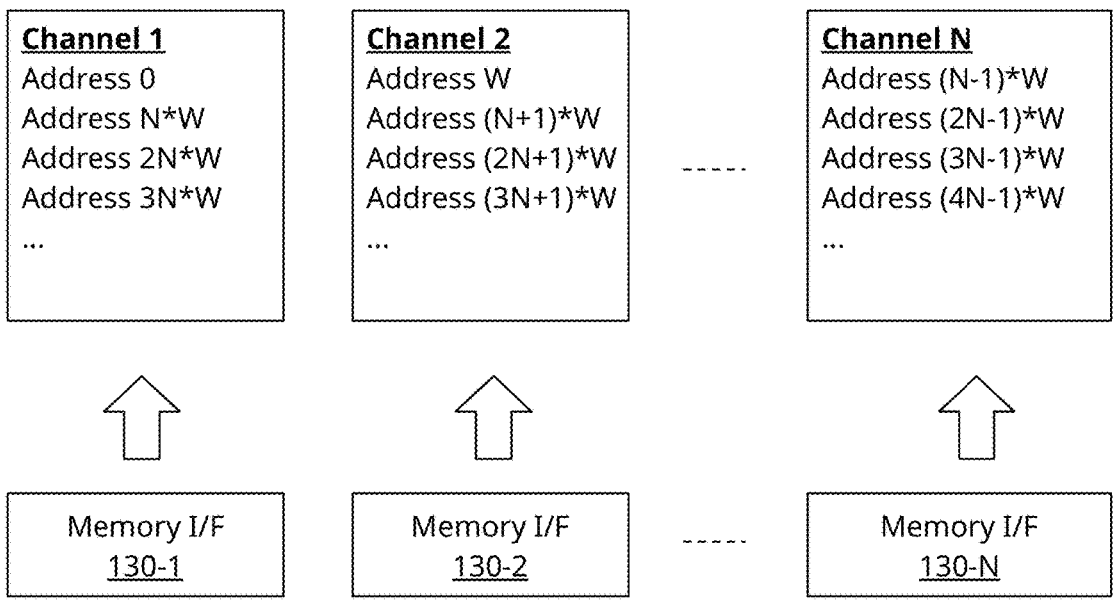
FIG. 1 - Prior Art

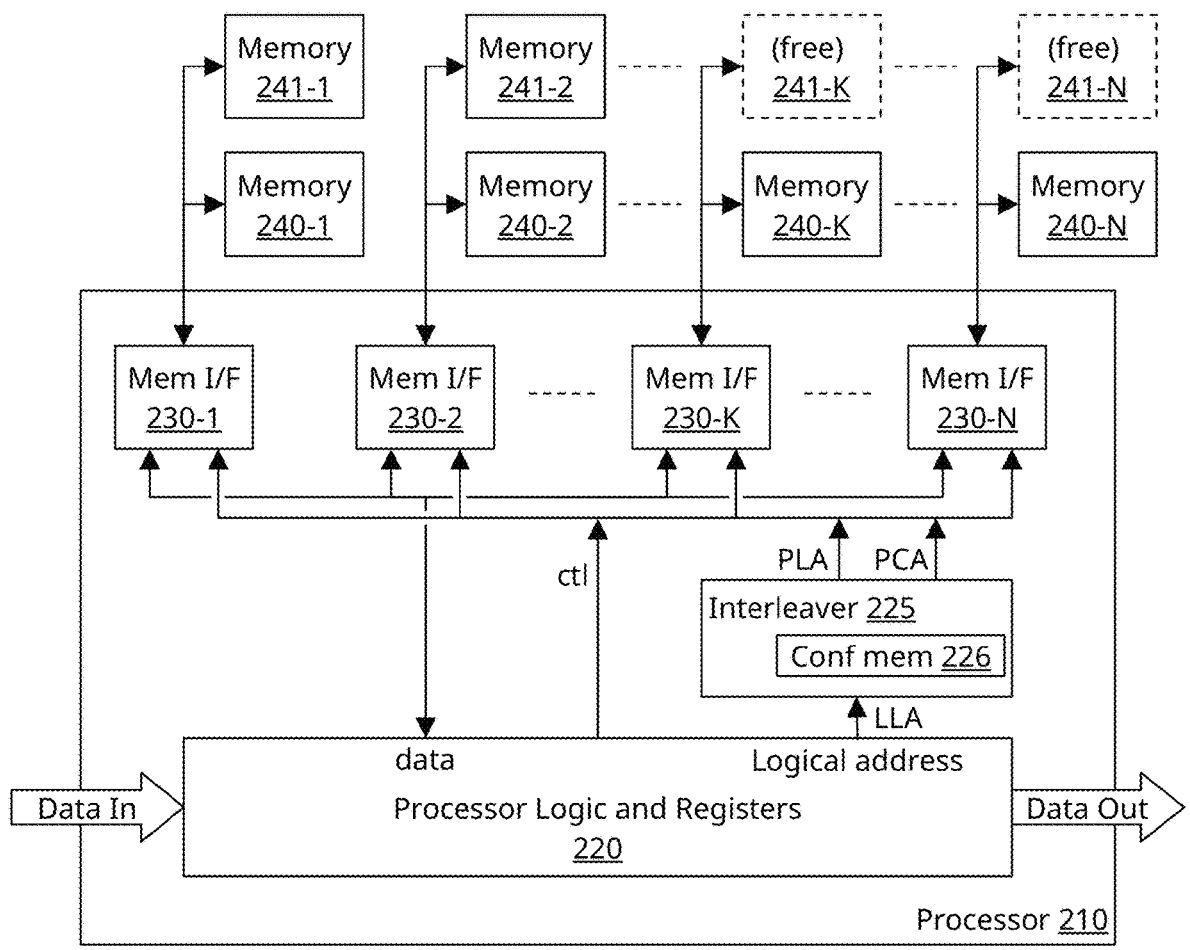
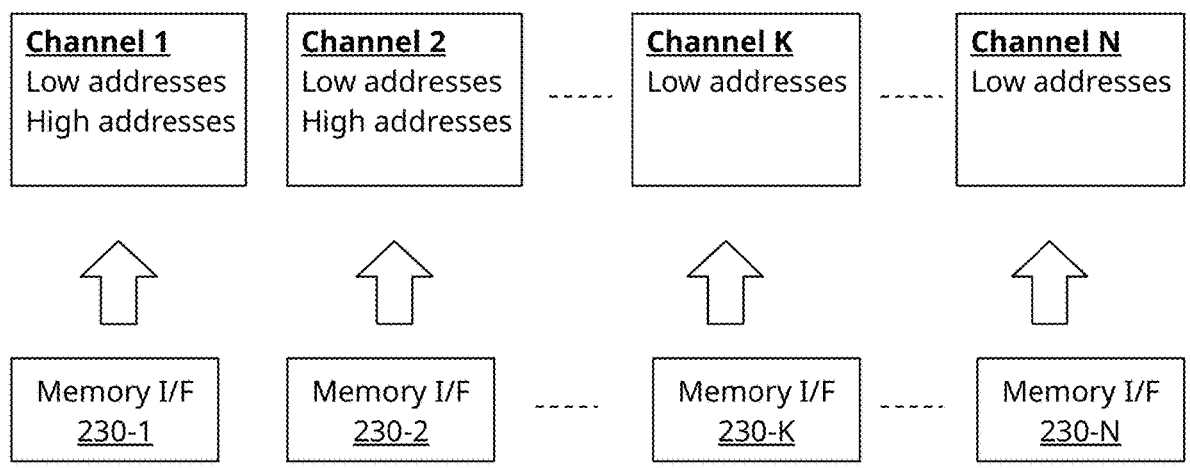
FIG. 2

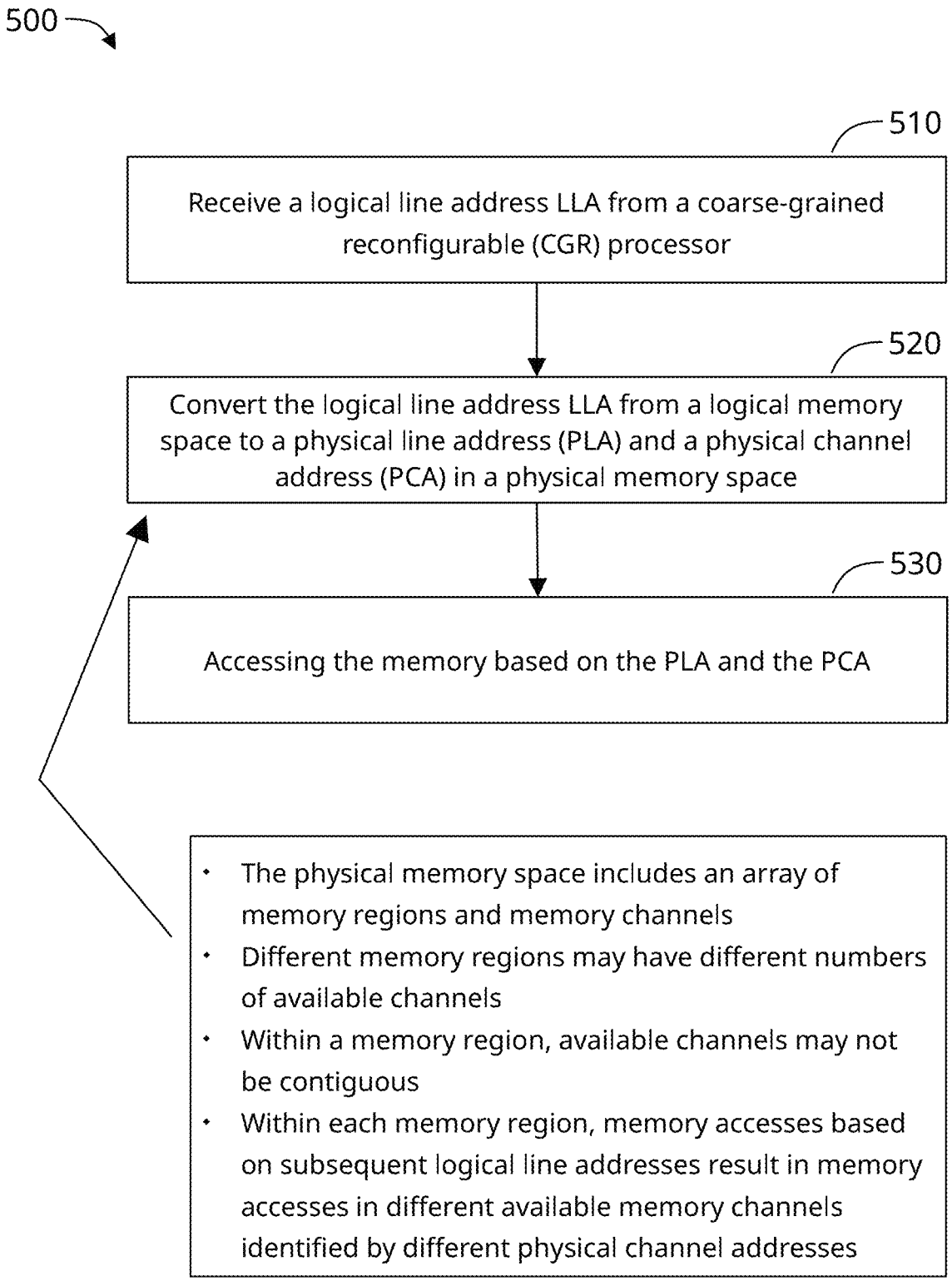
FIG. 5 – Accessing a Memory

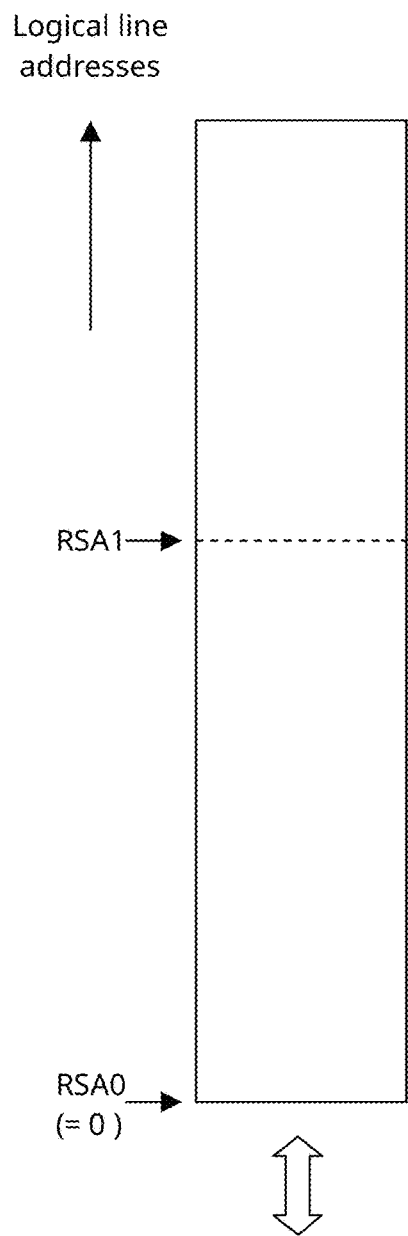
FIG. 6A – Logical memory space

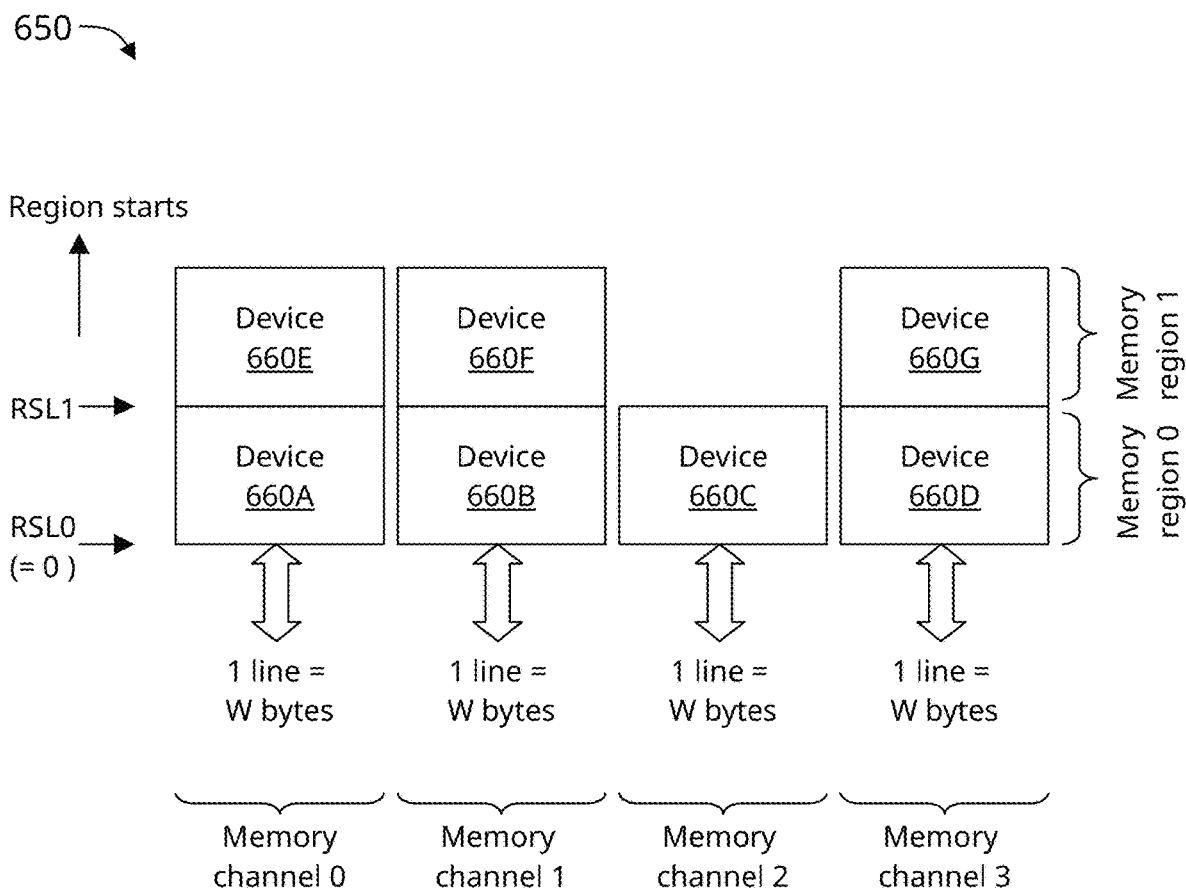
FIG. 6B – Physical memory space

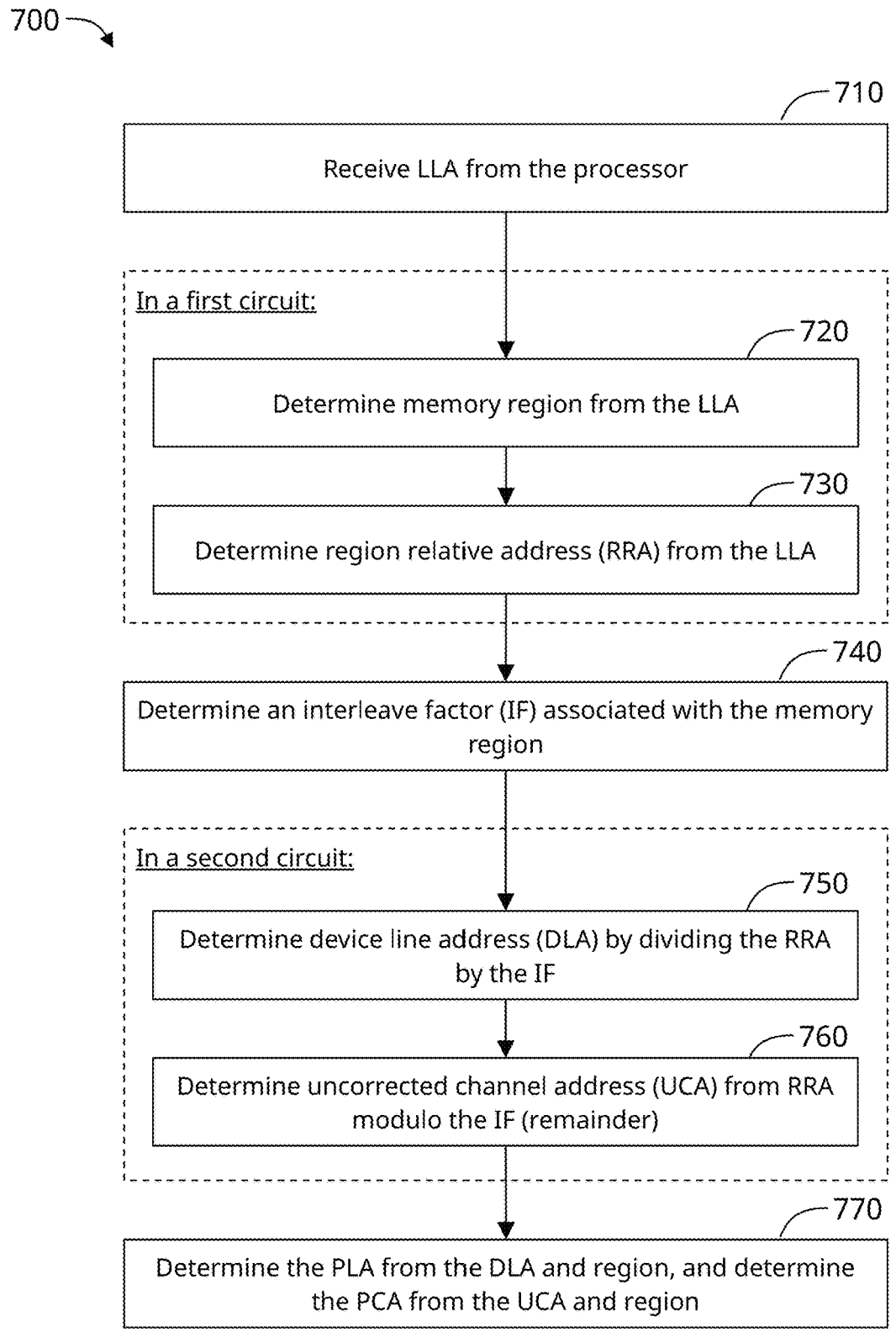
FIG. 7 – Converting an LLA to PLA and PCA
(logical memory space to physical memory space)

1000 ⟶

| LLA | Region | RSA | RRA | IF | DLA | UCA | CM | PCA |
|---|---|---|---|---|---|---|---|---|
| 0 | 0 | 0 | 0 | 2 | 0 | 0 | 1 | 1 |
| 1 | 0 | 0 | 1 | 2 | 0 | 1 | 2 | 2 |
| 2 | 0 | 0 | 2 | 2 | 1 | 0 | 1 | 1 |
| 3 | 0 | 0 | 3 | 2 | 1 | 1 | 2 | 2 |
| 4 | 0 | 0 | 4 | 2 | 2 | 0 | 1 | 1 |
| 5 | 0 | 0 | 5 | 2 | 2 | 1 | 2 | 2 |
| 6 | 1 | 6 | 0 | 4 | 0 | 0 | 0 | 0 |
| 7 | 1 | 6 | 1 | 4 | 0 | 1 | 1 | 1 |
| 8 | 1 | 6 | 2 | 4 | 0 | 2 | 2 | 2 |
| 9 | 1 | 6 | 3 | 4 | 0 | 3 | 3 | 3 |
| 10 | 1 | 6 | 4 | 4 | 1 | 0 | 0 | 0 |
| 11 | 1 | 6 | 5 | 4 | 1 | 1 | 1 | 1 |
| 12 | 1 | 6 | 6 | 4 | 1 | 2 | 2 | 2 |
| 13 | 1 | 6 | 7 | 4 | 1 | 3 | 3 | 3 |
| 14 | 1 | 6 | 8 | 4 | 2 | 0 | 0 | 0 |
| 15 | 1 | 6 | 9 | 4 | 2 | 1 | 1 | 1 |
| 16 | 1 | 6 | 10 | 4 | 2 | 2 | 2 | 2 |
| 17 | 1 | 6 | 11 | 4 | 2 | 3 | 3 | 3 |
| 18 | 2 | 18 | 0 | 3 | 0 | 0 | 0 | 0 |
| 19 | 2 | 18 | 1 | 3 | 0 | 1 | 1 | 1 |
| 20 | 2 | 18 | 2 | 3 | 0 | 2 | 2 | 2 |
| 21 | 2 | 18 | 3 | 3 | 1 | 0 | 0 | 0 |
| 22 | 2 | 18 | 4 | 3 | 1 | 1 | 1 | 1 |
| 23 | 2 | 18 | 5 | 3 | 1 | 2 | 2 | 2 |
| 24 | 2 | 18 | 6 | 3 | 2 | 0 | 0 | 0 |
| 25 | 2 | 18 | 7 | 3 | 2 | 1 | 1 | 1 |
| 26 | 2 | 18 | 8 | 3 | 2 | 2 | 2 | 2 |
| 27 | 3 | 27 | 0 | 4 | 0 | 0 | 0 | 0 |
| 28 | 3 | 27 | 1 | 4 | 0 | 1 | 1 | 1 |
| 29 | 3 | 27 | 2 | 4 | 0 | 2 | 2 | 2 |
| 30 | 3 | 27 | 3 | 4 | 0 | 3 | 3 | 3 |
| 31 | 3 | 27 | 4 | 4 | 1 | 0 | 0 | 0 |
| 32 | 3 | 27 | 5 | 4 | 1 | 1 | 1 | 1 |
| 33 | 3 | 27 | 6 | 4 | 1 | 2 | 2 | 2 |
| 34 | 3 | 27 | 7 | 4 | 1 | 3 | 3 | 3 |

FIG. 10

NON-UNIFORM MEMORY INTERLEAVING PROCESSOR

CROSS-REFERENCES

This application claims priority to U.S. Provisional Patent Application No. 63/292,251, entitled "Processor with Multiple-Interleave Memory Access," filed on Dec. 21, 2021, and is a continuation of U.S. patent application Ser. No. 18/085,340, entitled "Non-Uniform Memory Interleave Method," filed on Dec. 20, 2022.

The following are also incorporated by reference for all purposes as if fully set forth herein:
Prabhakar et al., "Plasticine: A Reconfigurable Architecture for Parallel Patterns," ISCA '17, Jun. 24-28, 2017, Toronto, ON, Canada; and
SambaNova whitepaper "Accelerated Computing with a Reconfigurable Dataflow Architecture", available on the sambanova.ai website.

This application is related to the following commonly owned application: U.S. Pat. No. 10,698,853, entitled, "Virtualization of a Configurable Data Processor," issued on Jun. 30, 2020, whose application Ser. No. 16/239,252 was filed on Jan. 3, 2019.

The above patents, patent applications, and publications are hereby incorporated by reference herein for all purposes.

BACKGROUND

Technical Field

The technology disclosed relates to memory access in electronic systems, and more particularly to a memory interleaving method and system therefor.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Processor integrated circuits (ICs) and systems that use memory often employ memory interleaving to increase performance. Consecutive memory accesses to consecutive addresses are mapped to different memory arrays ("banks") inside an IC or to different sets of chips on a printed circuit board (PCB). A processor chip may have multiple double data rate (DDR) memory interfaces ("channels") to communicate with multiple sets of parallel dual-in-line memory modules (DIMMs), rotating successive addresses among the multiple DIMMs. For example, a processor may have two DDR memory interfaces that are each wired to three parallel DIMM slots.

By rotating banks or channels between successive memory accesses, i.e., interleaving memory accesses, a second memory access can follow a first memory access while the earlier bank or channel is still busy. In other words, successive accesses can be performed in parallel. The more banks or channels there are, the higher the effective speed is for successive accesses.

In some cases, there can be multiple channels that do not have the same amount of memory space. For example, on a computer motherboard there may be two DDR channels with each three DIMM slots, and a user may have plugged in three or five equally sized DIMMs. In these cases, the two channels have different numbers of DIMMs and different amounts of memory. The two channels offer the potential for doubling the speed of memory access, but part of the memory space is only available on one of the channels. Thus, the computer may determine that since there is an unequal availability of DIMMs, it cannot guarantee successful interleaving, and it may not offer the option to do so. As a result, the computer's user suffers from slow memory access or lower memory capacity.

Another situation may be that a system board can for thermal or space reasons only support some number of memory chips that is not a multiple of the number of channels. Until now, these systems may have performed at suboptimal speeds.

SUMMARY

The technology disclosed relates to memory access in electronic systems, and more particularly to a memory interleaving method.

In a first aspect, an implementation provides a method for accessing memory in a physical memory space. The method comprises receiving a logical line address (LLA) from a processor, converting the LLA from the logical memory space to a physical line address (PLA) and a physical channel address (PCA) in a physical memory space, and accessing the memory based on the PLA and the PCA. The physical memory space includes an array of memory regions and memory channels. In a memory region, each memory channel may be available or unavailable. At the intersection of each memory region and each available memory channel sits one memory device. A memory device stores one line of data, including a series of one or more bytes, at a line address. Different memory regions may have different numbers of available memory channels. To interleave within a memory region that has multiple available memory channels, memory accesses based on subsequent logical line addresses (LLAs) result in subsequent physical memory accesses in different memory channels.

Converting the logical line address LLA from the logical memory space to the PLA and the PCA in the physical memory space comprises the following steps.

In a first circuit: determining the memory region from the LLA, and determining a region relative address (RRA) from the LLA.

In a second circuit: determining an interleave factor (IF) associated with the memory region, determining a device line address (DLA) by dividing the RRA by the IF, and determining an uncorrected channel address (UCA) from a remainder of dividing the RRA by the IF.

An implementation determines the PLA from the DLA and the memory region, and it determines the PCA from the UCA and the memory region.

The technology disclosed relates to memory access in electronic systems, and more particularly to a memory interleaving system.

In a second aspect, an implementation provides a processor that comprises processor logic and registers, a memory interleaver with a logical line address (LLA) input coupled with an output of the processor logic and registers, with a physical line address (PLA) output and a physical channel address (PCA) output, and multiple memory interfaces coupled with the PLA output and the PCA output. The memory interleaver controls access to the multiple memory interfaces using the PCA and the PLA. The PCA selects one of the multiple memory interfaces, and the PLA selects a memory location in a memory device coupled with one of the multiple memory interfaces.

The memory interleaver includes a first circuit and a second circuit. The first circuit determines a first memory region related to a first LLA and outputs a first region signal associated with the first memory region. The first circuit determines a first region relative address (RSA) from the first LLA by subtracting a first region start address associated with the first memory region from the first LLA.

The second circuit is coupled with a region signal output of the first circuit and an RRA output of the first circuit. The second circuit determines a first interleave factor (IF) associated with the first memory region. The second circuit performs a division of the first RRA by the first IF to obtain a first device line address (DLA), and to perform a modulo operation on the first RRA and the first IF to obtain a first uncorrected channel address (UCA).

The memory interleaver determines a first region start line (RSL) associated with the first memory region, and adds the first RSL to the first DLA to obtain a first PLA.

In some implementations, the memory interleaver uses the first UCA as a first PCA. In other implementation, the memory interleaver determines the first PCA from the first UCA and the first memory region, for example by consulting a channel map stored in a configuration register.

Particular aspects of the technology disclosed are described in the claims, specification and drawings.

BRIEF DESCRIPTION OF THE DRAWINGS

FIG. 1 illustrates an example system with a conventional processor with multiple channels for memory interleaving, and its memory map.

FIG. 2 illustrates an example system including a processor with multiple channels for memory interleaving, and its memory map.

FIG. 5 illustrates an example method of accessing a memory.

FIGS. 6A-B illustrates an example logical memory space and an associated physical memory space to which it must be translated.

FIG. 7 illustrates an example method of converting a logical line address (LLA) in a logical memory space to a physical line address (PLA) and a physical channel address (PCA) in a physical memory space.

FIG. 10 shows a table detailing how an implementation translates logical line addresses for the four memory regions in FIG. 9.

Figure 3:
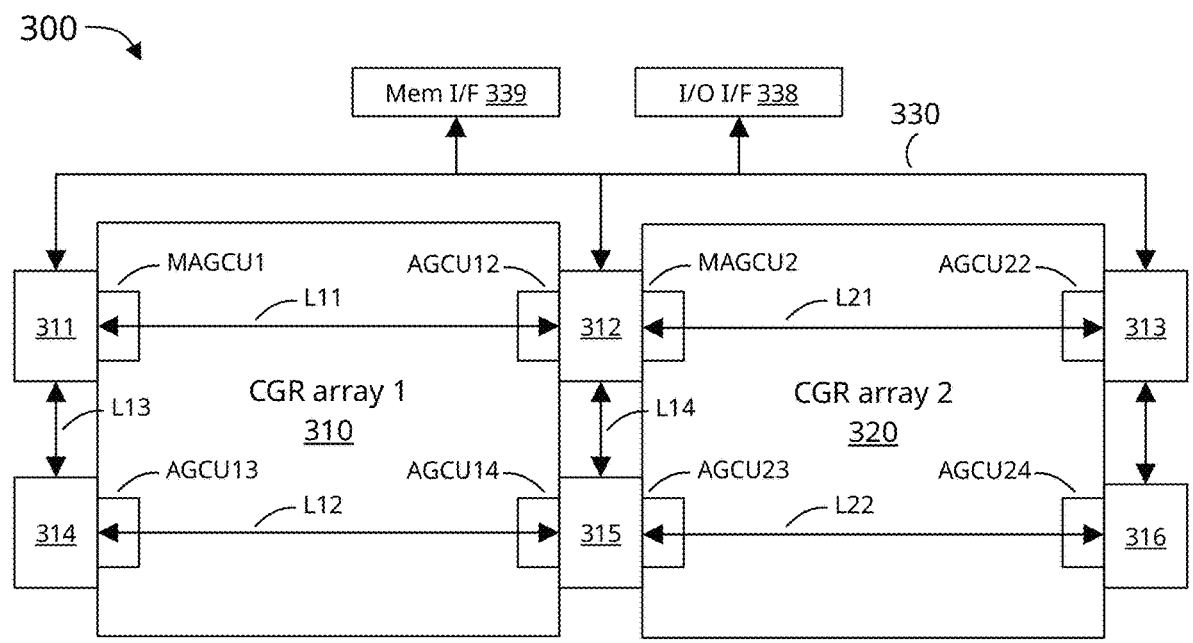
FIG. 3 illustrates an example implementation of a coarse grain reconfigurable (CGR) architecture (CGRA) including a top-level network and components.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope as claimed. Instead, they merely represent examples of different implementations of the disclosed technology.

DETAILED DESCRIPTION

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

AGCU—address generator (AG) and coalescing unit (CU).

BA—byte address: a memory address that defines the position of a byte in a memory. A byte address may include a line address and the byte position within the line.

CGRA—course-grain reconfigurable architecture.

CU—coalescing unit.

DDR—double data rate.

DIMM—dual in-line memory module.

DLA—device line address—the physical start address within a memory device at which a series of data bytes is stored.

FCMU—fused compute and memory unit—a circuit that includes both a memory unit and a compute unit.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are common in the industry, produced by the same supply chains, and for the average user often indistinguishable from monolithic circuits.

IF—interleave factor.

LA—line address.

LLA—logical line address: a memory address that defines the logical position of a series of W bytes in a memory, but that may not coincide with the series of bytes' physical position in the memory.

Logical address—an address of data stored in a memory as natively used by software/programs. The logical address may not directly include information related to the physical organization of the memory, or the data's physical location in the memory.

Memory device—at least a part of a memory array, memory chip, or memory module.

Memory region—a region of physical memory that is implemented with one or more parallel memory channels. A memory channel may be available or unavailable. An implementation can address available memory channels consecutively for consecutive memory accesses that may overlap. Thus, an implementation can achieve an interleave factor IF up to the number of available memory channels. Each memory channel may include one or more memory devices (memory chips or memory modules). All memory channels within a memory region can address at least a number of line addresses that is equal to the line depth of the memory region. Thus, the line depth of the memory region equals the smallest line depth of its available memory channels.

PCA—physical channel address—the index of a memory channel.

PCB—printed circuit board.

PCU—pattern compute unit—a compute unit that can be configured to repetitively perform a sequence of operations.

PMU—pattern memory unit—a memory unit that can locally store data according to a programmed pattern.

Processor—a processor includes any suitable hardware and/or software system, mechanism or component that processes data, signals or other information. A processor can include a system with a general-purpose central processing unit, multiple processing units, dedicated circuitry for achieving functionality, or other systems.

RRA—region relative address, the line address at which information is stored in a memory region, relative to the logical line address at which the memory region starts.

RSA—region start address, the logical line address at which a memory region starts.

RSL—region start line, the physical line address at which a memory region starts within a memory channel. In some implementations, the RSL may be specific to both a memory region and a memory channel.

UCA—uncorrected channel address. Some implementations use the UCA directly to select the memory channel. Other implementations correct the UCA with information from a channel map table to obtain the physical channel address.

Implementations

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIG. 1 illustrates an example system 100 including a conventional processor 110 with multiple channels for memory interleaving, and its memory map 150. Processor 110 may include processor logic and registers 120 to process data, and memory interface 130-1 through memory interface 130-N to couple processor logic and registers 120 with external memory. The N parallel memory interfaces form N channels allowing memory interleaving with an interleave factor (IF) equal to N, and thus a potential bandwidth increase of N times. For example, memory interface 130-1 interfaces with external memory 140-1 and external memory 141-1. Memory interface 130-2 interfaces with external memory 140-2 and external memory 141-2, and so on. The external memories may be soldered onto a PCB, for example the same PCB on which processor 110 has been soldered, or processor 110 and/or the external memories may be mounted on a substrate or other common carrier. In a configuration often found, the external memories may be included in DIMMs that are plugged into sockets mounted on the same PCB as the processor IC.

Each channel may have a width of W bytes, also called the line size or channel width. Memory map 150 shows byte addresses for the available channels. The first W bytes are at line address 0 of channel 1, the second W bytes are at line address 0 of channel 2, etc. Thus, a first memory access of W bytes may be on channel 1, and a second, successive, memory access of W bytes may be on channel 2, and so. To enable interleaving, all channels must have equal amounts of memory attached, and all channels must have equal channel width.

FIG. 2 illustrates an example system 200 including a processor 210 with multiple channels for memory interleaving, and its memory map 250. System 200 includes processor logic and registers 220 to process data, memory interface 230-1 through memory interface 230-N to couple processor logic and registers 220 with external memory, and memory interleaver 225. The N parallel memory interfaces form N channels allowing memory interleaving with an interleave factor IF up to N, and thus a potential bandwidth increase of N times. Unlike conventional system 100, system 200 does not require the channels to have equal amounts of memory attached to enable interleaving. For example, all N channels may have low addresses in their memory map, provided by memory device 240-1 through memory device 240-N, but only the first K-1 channels have high addresses in their memory map, provided by memory device 241-1 through memory device 241-(K-1). There may be unused sockets, or no sockets, or defective memories for channels K through N. An implementation may be configured (for example, hard-wired or soft-wired) for a particular availability of memories, or it may sense availability of memories (for example, in a power-up routine) and store a mapping based on the availability.

The unequal memory sizes of the channels pose a challenge for interleaving. Whereas conventional systems might forego or limit memory interleaving, system 200 allows setting its interleave factor to match the available situation in a memory region, and adjusts its address calculation accordingly. For low addresses (a first memory region), it may interleave with the IF set at N, whereas for high addresses (a second memory region), it may interleave with the IF reduced to K-1.

As described with reference to later figures, implementations of the technology disclosed herein can handle many more configurations of external memory, and still interleave at optimum speed in each memory region in the memory map. This is achieved by memory interleaver 225, which is coupled between the address output of processor logic and registers 220 and the address inputs of memory interface 230-1 through memory interface 230-N. An implementation may route memory control commands directly from processor logic and registers 220 to memory interface 230, or via memory interleaver 225. Memory interleaver 225 may use one or more configuration memories 226, which may include registers, look-up tables, or other memories that may hold information about the memory map, such as region start and/or end byte addresses or line addresses, interleave factors, and channel maps. Some implementations include the one or more configuration memories inside memory interleaver 225. In other implementations, one or more configuration memories may be outside memory interleaver 225. In the examples described in this patent document, memory interleaver 225 receives a logical line address LLA from processor logic and registers 220, and outputs in response a physical line address PLA and a physical channel address PCA.

In some implementations, processor logic and registers 220 includes a network and components of a CGR architecture as further described in U.S. Pat. No. 10,698,853, which is incorporated by reference herein.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
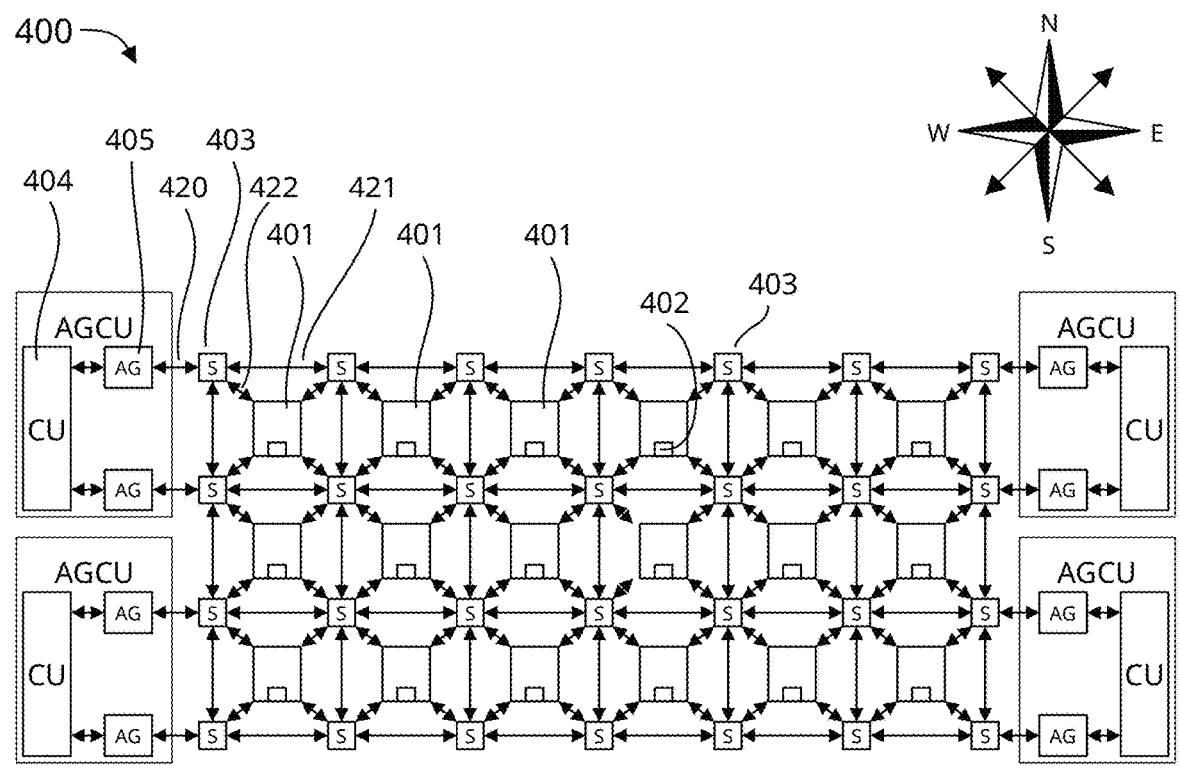
FIG. 4 illustrates an example CGR array, including an array of CGR units in an ALN.

FIG. 4 illustrates an example CGR array 400, including an array of CGR units in an ALN. CGR array 400 may include several types of CGR unit 401, such as FCMUs, PMUs, PCUs, memory units, and/or compute units. For examples of the function of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

FIG. 5 illustrates an example method 500 of accessing a memory. The memory may have an architecture in which memory devices are arranged in a matrix topology with memory regions in one dimension and memory channels in another dimension. Each memory region intersects with the same number of memory channels. However, some memory channels may be available (i.e., there are one or more functional memory devices in that memory channel for that memory region), whereas other memory channels may be unavailable. In general, different memory channels may not have the same number of available memory channels, i.e., a first memory region may have a different number of available memory channels than a second memory region. At the intersection of a memory region and each available memory channels sits one "memory device", which in the context of this patent document may be or include a part of a memory IC, a whole memory IC, multiple memory ICs, part or all of a memory module, or multiple memory modules, part or all of a memory array, or multiple memory arrays. At the intersection of a memory region and each unavailable memory channel there is no memory device.

The memory is accessed by a processor, which may be a reconfigurable processor or a CGR processor, and which internally operates with logical line addresses (LLAs) in a logical memory space. A "line" in this context means a series of W consecutive bytes. Therefore, an LLA could be derived from a byte address (BA) by integer division of BA by W. A logical memory space may be contiguous (in some implementations it is not contiguous). It generally has no awareness of the physical architecture of the memory, and no awareness of physical actions like interleaving to speed up the access to blocks of memory that may contain many bytes that are stored consecutively.

Method 500 is executed by memory interleaver 225 and comprises:

Step 510—receiving the logical line address LLA from the CGR processor. In some implementations, the CGR processor directly provides the LLA, and in other implementations, the CGR processor provides a byte address BA. In such implementations, memory interleaver 225 derives the LLA from the BA by integer division (divide, and round down to the nearest integer).

Step 520—converting the logical line address LLA from the logical memory space to a physical line address (PLA) and a physical channel address (PCA) in the physical memory space. Further details of the conversion are described with reference to FIG. 7.

Step 530—accessing the memory based on the PLA and the PCA. The PCA addresses available memory channels in each memory region. Successive lines in a memory region are stored with successive PCA addresses, so that it is possible to fully or partially overlap consecutive line accesses to increase the access speed. For example, for consecutive line accesses within a memory region, the PCA rotates among the available memory channels. If within a memory region the first, second, and fourth memory channel are available, then the PCA might address these as 0, 1, 3, 0, 1, 3, 0, . . . etc. Each time the PCA resets, the PLA is incremented by one. By interleaving with a factor of 3, the average memory access time can be improved by up to three times.

FIGS. 6A-B illustrates an example logical memory space 600 and an associated physical memory space 650 to which logical line addresses must be converted. The logical memory space 600 operates independent of any external memory architecture, and is unaware of the number of individual memory devices, their capacity, and any performance enhancing methods like interleaving. It is the memory space that is used in processor logic and registers 220 of FIG. 2 and that is relevant to a compiler that generates configuration files that control processor operation. The physical memory space 650 in FIG. 6B is important for a system implementation, where the processor and external memory devices may be mounted on the same PCB, and the processor must be able to support a memory architecture that requires different interleaving, dependent on the area that is used. The logical memory space assumes access to one line of W bytes at a time (write and read accesses, indicated by the two-way arrow at the bottom of the memory tower), and assumes that the processor interfaces with a memory that is one line wide and whose location is determined by a simple address, the logical line address (LLA). For convenience of use by software executed on the processor, logical memory space 600 may be contiguous, i.e., there are no unused LLAs mixed with used LLAs. The processor may access adjacent data in adjacent lines. When a block of data is accessed, the processor iterates through successive adjacent LLAs. This is undesirable in a physical memory, as the memory access times limits the speed with which successive accesses can be made. Instead, in physical memory, the successive accesses are distributed over separate memory devices that can be accessed at least partially in parallel. In this way, a logical memory space that assumes a single memory channel of one line wide and $L_{MAX}$ lines total can be realized with N memory devices that can each store $L_{MAX}/N$ lines of data. The N memory devices may be arranged in an array of M memory channels (each one line wide) and R memory regions. For example, logical memory space 600 may require a total memory of 7 GB, which can be realized in the physical memory space 650 which utilizes 7 memory devices 660A-G of 1 GB each and that may be organized in an array of M=4 memory channels and R=2 memory regions. The array may not be fully filled. For example, memory channel 2 may have only one memory device, while the other memory channels may each have 2 memory devices. In memory region 0, it is possible to execute 4 overlapping memory accesses (interleave with IF=4), whereas in memory region 1, it is only possible to execute 3 overlapping memory accesses (interleave with IF=3).

The bits of the LLA can be converted to the bits of a physical channel address (PCA) which identify the memory channel (either as binary number index or as a one-hot code), and that identify the physical line address (PLA). Implementations of the disclosed technology may map one part of logical memory space 600 onto memory region 0, and another part onto memory region 1. As a result, some implementations use one or more most significant bits of the LLA to identify the memory region. Other implementations, where the number of lines in a memory region is not a power of two, may use up to all bits of the LLA to identify the memory region.

In the example of a 7 GB memory, if the line width W is 8 bytes, the total number of line addresses requires an LLA of 30 bits, e.g., bit_29 ... bit_0. An implementation may use bit_29 as a region index to direct a memory access to either memory region 0, or memory region 1. To interleave over 4 memory channels, as can be done in memory region 0 of physical memory space 650, requires a PCA of 2 bits. These must be the two least significant bits of the LLA (bit_1 and bit_0) to ensure that successive accesses are distributed over different memory channels. The remaining bits bit_28 through bit_2 can be used to address the data line within each of the memory devices 660. Together, these bits bit_28 through bit_2 form a device line address (DLA). However, a practical implementation may require combining the region index and the DLA into the physical line address PLA, which simultaneously addresses all memory in a memory channel.

In this document, the LLA that maps to the address of a first line of a (physical) memory region is called the region start address RSA. FIG. 6A shows RSA0 and RSA1 as the region start addresses for memory region 0 and memory region 1. In the physical memory space, each memory region has a first line that is called the region start line (RSL). In this manner, RSA0 corresponds to RSL0 (both are zero), RSA1 translates into RSL1, RSA2 translates into RSL2, and so on. Although the examples presented in this document may suggest that bits taken from the LLA to determine the memory region are always the most significant bits, some implementations take other bits to determine the memory region. However, the memory channel is typically determined from one or more least significant bits of the LLA to guarantee interleaving. Some implementations may scramble or hash bits from the LLA to determine bits from the DLA and/or PCA.

Within each memory region, an implementation can interleave with a consistent IF, but it can interleave with different IFs in different memory regions. Thus, each memory region has an individual IF.

A byte address (BA), in the context of this patent document, may indicate the logical position of a byte in a memory, without awareness of the byte's physical location. The byte address can be converted to a logical line address (LLA), based on an assumed physical memory organization with a single memory channel, where applying the LLA to the single memory channel gives access to a series (a line) of W bytes. For example, if the memory channel is 8 bytes wide, the logical line address Is determined by dividing the byte address by 8 and rounding down. Generally:

$$LLA = \text{rounddown}(BA \div W) \quad (1)$$

The implementation must calculate the physical line address based on the physical memory architecture. This includes the memory regions, and the number of memory devices (or memory channels) that are available in each memory region. Examples in this patent document assume that for each memory region, the address space begins with a device line address (DLA) at location zero. The physical line address may combine the DLA with the region index (e.g., 0 (zero) for memory region 1, 1 (one) for memory region 2, and so on).

An implementation uses at least a part of one or more least significant bits of an LLA to determine the address of the memory channel (the uncorrected channel address UCA or physical channel address PCA). In some implementations, subsequent memory channels may not coincide with subsequent physical memory channels since, by design or by detected device failure, some memory channels may not be available within some of the memory regions. In those implementations, the UCA needs to be corrected for information in a channel map to obtain the PCA. However, other implementations may directly use the UCA as the PCA.

An implementation can determine the memory region by looking the address up in a memory map, i.e., by comparing either the LLA (or even the BA) with entries in a list of memory region boundaries. It generally takes less hardware to store and compare logical line addresses than byte addresses, so an implementation may prefer to store the memory region boundaries as LLAs and to determine the memory region from the LLA. Once the implementation has determined the memory region, it can determine, for example by looking up, a region relative address (RRA), an interleave factor (IF), and a channel map for the memory region. The RRA provides the line address relative to the beginning of its memory region start boundary. The memory region boundaries stored in the memory map may be region start addresses, or region end addresses.

In implementations with a potentially or actually noncontiguous channel map, the available memory channels in a memory region may not be strictly successive. When a memory device is determined defective, its memory channel must be removed from the channel map, the IF must be adjusted, and interleaving must skip the defective channel. For example, a good first memory region may have 8 adjacent memory channels, and an IF=8. The first memory region may have a channel map of $\{0, 1, 2, 3, 4, 5, 6, 7\}$, where the channel map is a list of consecutively available memory channels. In the second memory region, the third memory channel may be unavailable due to a defective chip. Thus, the second memory region has seven available memory channels that are not all contiguous. The IF=7, which results in slightly lower performance. The channel map has a gap, and is $\{0, 1, 3, 4, 5, 6, 7\}$. An example implementation of memory interleaver 225 that allows this type of channel map is described with reference to FIG. 8. The channel map may also intentionally reorder the memory channels. This may provide higher performance in certain implementations, or may serve other purposes.

Some implementations may store the channel maps not as lists of absolute numbers, but as lists of relative numbers, e.g., channel correction factors (CCFs). In such an implementation, the memory map of the first memory region may be a series of 8 zeroes $\{0, 0, 0, 0, 0, 0, 0, 0\}$ and the memory map of the second memory region may be a series of 7 channel correction factors $\{0, 0, 1, 1, 1, 1, 1\}$. An example implementation of memory interleaver 225 with this type of channel map is described with reference to FIG. 11.

The implementation may determine the region relative address RRA by subtracting the region start address RSA from the logical line address:

$$RRA = LLA - RSA \quad (2)$$

The implementation may split the RRA in the uncorrected channel address (UCA) and the device line address (DLA) with modulus and division/round-down operations:

$$UCA = RRA \bmod IF \quad (3)$$

$$DLA = \text{rounddown}(RRA \div IF) \quad (4)$$

The implementation must correct the UCA for gaps in the memory region, such as defective memories.

If the channel map lists PCAs directly, it is found from PCA=channel_map(region, UCA).

If the channel map stores channel correction factors as described above, then the CCF is a function of the region and the UCA, or CCF=channel_map(region, UCA), and the physical channel address (PCA) is found from:

$$PCA=UCA+CCF \quad (5)$$

The DLA, which is valid within a memory region, is used to find the physical line address (PLA) by adding the region start line (RSL) of that region to the DLA. Within a memory region, each memory device may start with the same RSL. Thus, the RSL is a function of the memory region only and can usually be determined as soon as a memory architecture is known. In some memory architectures, the RSL can directly be read from one or more most significant bits of the LLA. In other memory architectures, the RSL can be derived from one or more most significant bits of the LLA by a combinational logic network. In yet other memory architectures, the RSL can be stored in a lookup table as a function of the memory region. In some implementations, the RSL may be defined by both the memory region and the memory channel. An implementation derives the PLA from the DLA and the memory region as follows:

$$PLA=DLA+RSL(\text{region}) \quad (6)$$

With the physical channel address (PCA) and the physical line address (PLA) known, the implementation addresses the correct data even in memory regions of different sizes, memory regions of different line depths, and memory regions with missing devices.

In general, the address conversion is simple if both the parameters W and IF are powers of 2. In a case where, for example, the channel width is 64 bytes, i.e., W=64, the conversion can simply truncate the 6 least significant bits of the byte address BA to obtain the LLA. The RRA might be obtained from the LLA by splitting off one or more most significant bits that identify the memory region. Similarly, in some cases the RSL may be obtained from the LLA or even from the RRA by splitting off one or more most significant bits. If IF=4, then the UCA equals the two least significant bits of the RRA, and if IF=8, then the UCA equals the three least significant bits of the RRA. The remaining bits, less those used for determining the RRA, are used to determine the device line address DLA. The LLA bits used for determining the RSL plus the bits of the DLA may make up the PLA. An example implementation of memory interleaver 225 with simple circuitry is given in FIG. 12.

FIG. 7 illustrates an example method 700 of converting a logical line address (LLA) in a logical memory space to a physical line address (PLA) and a physical channel address (PCA) in a physical memory space. The physical memory space has an array of memory regions and memory channels that enable interleaving successive memory accesses to improve the access speed. The logical memory space is as described with reference to FIG. 6A, and the physical memory space is as described with reference to FIG. 6B. Method 700 comprises:

Step 710—receiving the LLA from a processor. The processor may be reconfigurable or coarse-grained reconfigurable.

In a first circuit, method 700 performs Step 720 and Step 730:

Step 720—determining a memory region from the LLA. The first circuit may include a first configuration memory that stores one or more region boundary addresses, for example region start addresses (RSAs) or region end addresses. It may compare the LLA with some or all of the region boundary addresses to determine a memory region index. Some implementations compare not the full LLA with a full RSA, but only one or more most significant bits. In other implementations, the first circuit determines the region index directly from one or more most significant bits of the LLA. In yet other implementations, the first circuit uses a first combinational logic circuit to perform a logic operation to determine the region index from one or more most significant bits of the LLA. Further implementations may output the memory region not as a memory index but as a one-hot code.

Step 730—determining a region relative address (RRA) from the LLA. To determine the RRA, an implementation may subtract the RSA (for example obtained from the first configuration memory) from the LLA. In some implementations, where the region index is directly encoded in one or more most significant bits of the LLA, the first circuit may simply remove these one or more most significant bits from the LLA to obtain the RRA.

Step 740—determining an interleave factor (IF) associated with the memory region. In some implementations, the IF is simply the number of available memory channels in the memory region. However, other implementations allow for using a lower IF, for example a factor of IF. For example, if there are 6 available memory channels in a memory region, then the implementation allows interleaving with IF=1 (no interleaving), IF=2, IF=3, and IF=6. In further implementations, The IF must be a power of two, i.e., IF=1, IF=2, IF=4, etc. Yet further implementations allow for setting IF at any value between 1 and the number of available memory channels.

An implementation may store the IF in the first configuration memory, in a second configuration memory, or even implicitly store the IF in its hard-wired circuits and depends on a memory region signal (the region index, or region one-hot code). An example of an implementation where IF is implicitly hard wired rather than explicitly stored is described with reference to FIG. 13.

In a second circuit, method 700 performs Step 750 and Step 760:

Step 750—determining a device line address (DLA) by dividing the RRA by the IF. In some implementations, the second circuit includes an integer divider to perform an integer division by IF on the RRA. In other implementations, where IF is limited to powers of 2, the second circuit performs the division by truncating least significant bits that contain the memory channel. Note that such truncation may be dependent on the memory region. For example, in a memory region where IF=2, the second circuit truncates one bit from the RRA. In another memory region where IF=4, the second circuit truncates two bits from the RRA. Whether using an integer divider or truncating bits, the second circuit performs a division and a round down operation.

Step 760—determining an uncorrected channel address (UCA) from a remainder from dividing the RRA by the IF. Whereas the integer result of the division of RRA by IF in Step 750 signifies the number of interleave cycles that has been completed, the remainder of the division signifies where in the present interleave cycle the line is stored, or in other words which memory channel is currently used. The remainder can be obtained by a modulo operation (remainder=RRA mod IF). The second circuit may perform the modulo operation in the same logic circuitry as the division, or it may perform it in a separate logic circuit. In an implementation that limits the IF to powers of 2, the modulo operation can be performed simply by taking the least significant bits of the RRA that signify the memory channel. Note that such operation may be dependent on the memory region. For example, in a memory region where IF=2, the second circuit uses one bit from the RRA. In another memory region where IF=4, the second circuit uses two bits from the RRA.

An implementation that limits the IF to powers of 2 may perform Step 750 and Step 760 jointly by splitting the RRA in a first group of bits and a second group of bits. The first group of bits identifies the DLA and the second group of bits identifies the UCA. The second group of bits consists of one or more least significant bits of the RRA, and the number of bits in the second group is determined by the IF that is valid in that memory region. For example, in a memory region where IF=2, the second circuit splits off one bit for the UCA, and the DLA is determined by the remaining bits. In a memory region where IF=4, the second circuit splits off two bits for the UCA, and the DLA is determined by the remaining bits, etc. The splitting of the bits constitutes an integer division by the power of two of the IF for the first group of bits with a remainder in the second group of bits.

Additionally, the second circuit may permutate the bits in the first group of bits. Permutating the bits results in a scrambling of the device line addresses within the memory region. In implementations where the order of device line addresses is unimportant, permutation of the bits can significantly reduce the amount of logic circuits needed to implement memory interleaver 225, as will be shown with reference to FIG. 13.

Step 770—determining the PLA from the DLA and the region, and determining the PCA from the UCA and the region. To determine the PLA from the DLA, implementations determine a region start line (RSL) associated with the memory region, and add the RSL to the DLA to obtain the PLA. An implementation may look up the RSL in a third configuration memory, addressed by the region index obtained in the first circuit. In some cases, one or more most significant bits of the LLA identify the memory region as a factor that includes the RSL, and an implementation can simply prepend those bits to the DLA to obtain the PLA.

Some implementations directly use the UCA as the PCA. This is possible when memory channels are contiguous within each memory region, starting at channel 0, and without a need to skip defective memory devices. Other implementations use a second combinational logic circuit with inputs for the UCA and the region index (or other signal) to perform a logic operation to calculate the PCA. Yet other implementations look up the PCA in a fourth configuration memory. The fourth configuration memory is addressed by the region index and the UCA. The PCA may be encoded as a binary number (an index) or as a one-hot code. A person skilled in the art will appreciate that execution of method 700 using first and second circuits is just one implementation. In other implementations, multiple steps of the method can be performed by just one circuit, one step of the method can be performed by multiple circuits, or any combination and permutation of steps of the method can be performed by any combination and permutation of circuits.

Figure 8:
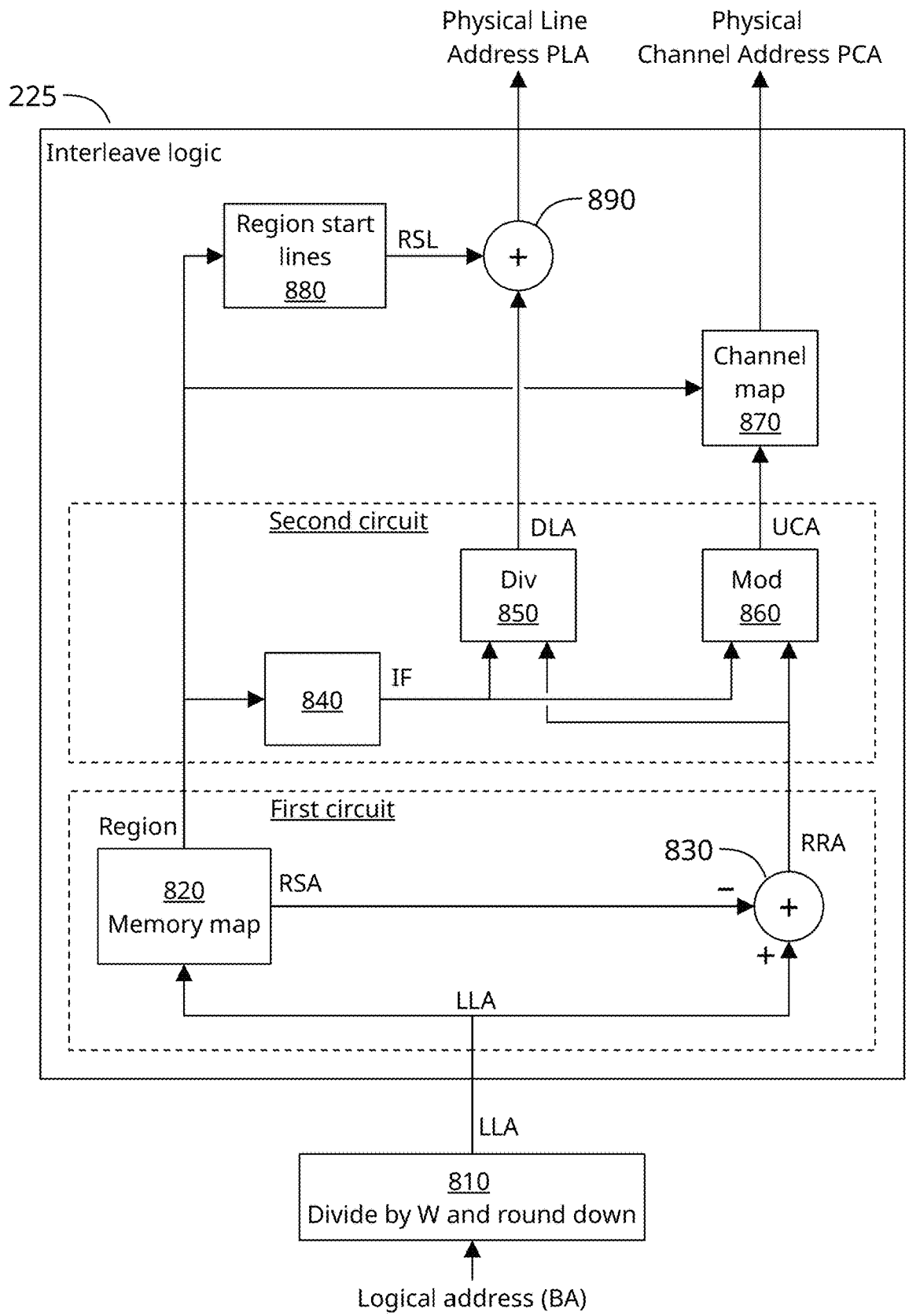
FIG. 8 illustrates an example implementation of the memory interleave logic.

FIG. 8 illustrates an example implementation of the memory interleaver 225. The implementation receives a logical line address LLA to determine a physical channel address PCA and a physical line address PLA. If only a byte address BA is available, memory interleaver 225 may include divider 810, which receives BA at its input, divides it by the channel width W, and rounds down the result to obtain a logical line address LLA according to formula (1) above. If W is a power of 2, divider 810 may simply truncate $\log_2 W$ bits from BA to obtain LLA. FIG. 8 shows a first circuit and a second circuit, delineated by dashed boxes. The first and second circuit determine a device line address (DLA) and an uncorrected channel address (UCA) from the LLA. A person skilled in the art will appreciate that determining the UCA and DLA using first and second circuits is just one implementation. In other implementations, multiple steps of the determination can be performed by just one circuit, one step of the determination can be performed by multiple circuits, or any combination and permutation of steps of the determination can be performed by any combination and permutation of circuits.

The first circuit determines the memory region (for example, a region index) from the LLA and a region relative address RRA. The first circuit includes circuit 820 and subtractor 830.

Circuit 820 determines the memory region from the LLA. On a first output, circuit 820 outputs an index that indicates the memory region. For example, the index may be 0 (zero) for the first memory region, 1 (one) for the second memory region, 2 (two) for the third memory region, and so on. On a second output, circuit 820 may output the region start address RSA associated with the memory region found for the LLA.

Circuit 820 may compare the LLA with logical line addresses of the memory region boundaries (region start addresses or region end addresses) stored in a first configuration memory, and include the first configuration memory and one or more comparators to compare the LLA with successive stored memory region boundaries. Some implementations may not include a first configuration memory, and the memory map is hard wired. Those implementations may use combinational logic to determine the region from one or more bits of the LLA. In a basic case, one or more most significant bits from the LLA directly indicate the memory region.

Subtractor 830 has a positive input coupled with the output of divider 810 and a negative input coupled with the second output of circuit 820 to calculate the RRA according to formula (2) above.

Some implementations may combine circuit 820 and subtractor 830. For example, they may simply split the LLA into one or more most significant bits from which they determine the memory region, and remaining bits that constitute the RRA.

The second circuit determines the DLA by dividing the RRA by the IF, and the UCA from a remainder of dividing the RRA by the IF. The second circuit includes second configuration memory 840, circuit 850, and circuit 860.

The second configuration memory 840 is coupled with the first output of circuit 820 and uses the memory region as the address or index under which it stores the interleave factor IF associated with the memory region. Some implementations may combine second configuration memory 840 with the first configuration memory included in circuit 820, and provide circuit 820 with a third output for the IF signal.

The output of second configuration memory 840 (providing the IF) is coupled with a first input of circuit 850 and a first input of circuit 860. The output of subtractor 830 (providing the RRA) is coupled with a second input of circuit 850 and a second input of circuit 860. Circuit 850 performs the division and round-down operation of formula (4) above to obtain the DLA from the RRA and the IF. Circuit 860 performs the modulus operation of formula (3) above to obtain the UCA from the RRA and the IF.

Memory interleaver 225 derives the PLA from the DLA by looking up a region start line RSL in third configuration memory 880. It adds the region start line RSL to the device line address DLA in adder 890 to obtain the physical line address PLA.

Implementations that don't correct for defective or missing memory devices may directly output the UCA as the physical channel address PCA. However, implementations that support skipping defective or missing memory devices comprise a fourth configuration memory 870 storing a channel map to obtain the PCA from the region and the UCA.

The fourth configuration memory 870 has two inputs to receive the region index and UCA information. The first input is coupled with the output of circuit 820 to receive the region index, and the second input is coupled with the output of circuit 860 to receive the UCA. Based on the combination of region and UCA, fourth configuration memory 870 outputs the PCA.

Figure 9:
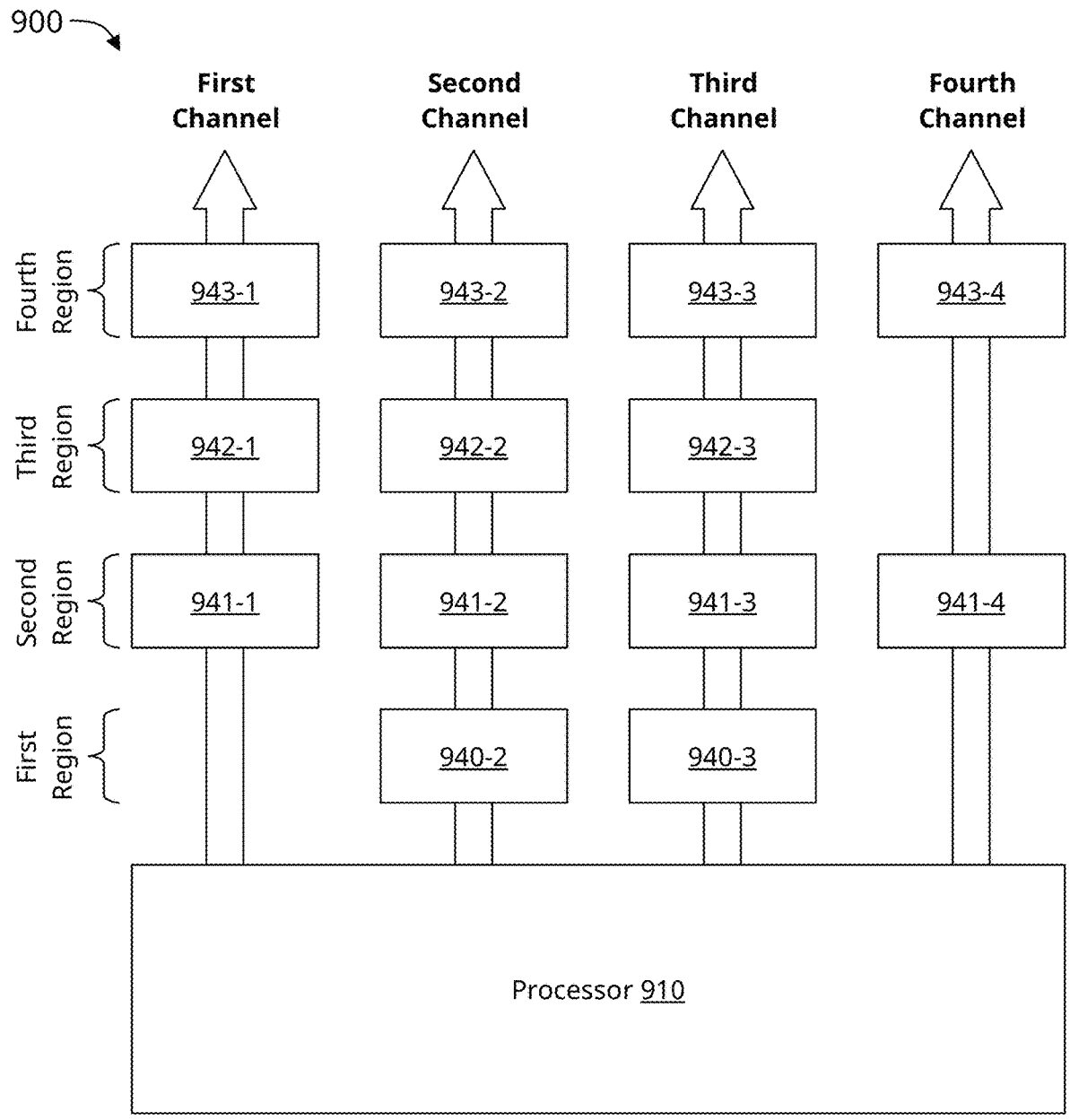
FIG. 9 illustrates an example system including a processor IC with four memory channels (four memory interfaces) and memories coupled with the memory interfaces.

FIG. 9 illustrates an example system 900 including a processor IC 910 with four memory channels (requiring four memory interfaces) and memories coupled with the memory interfaces. This example system shows how line addresses can be corrected. There are a total of thirteen 1-GB memory chips coupled as follows.

In a first memory region (region 0), there are 2 chips (memory 940-2 and memory 940-3). The first memory region provides logical line addresses for bytes 0-(2G-1), and may be interleaved with a first interleave factor ($IF_1=2$). The memories are coupled with the second and third memory channels.

In a second memory region (region 1), there are 4 chips (memory 941-1 through memory 941-4). The second memory region provides logical line addresses for bytes 2G-(6G-1), and may be interleaved with a second interleave factor ($IF_2=4$). The memories are coupled with the first through fourth memory channels.

In a third memory region (region 2), there are 3 chips (memory 942-1 through memory 942-3). The third memory region provides logical line addresses for bytes 6G-(9G-1), and may be interleaved with a third interleave factor ($IF_3=3$). The memories are coupled with the first through third memory channels.

In a fourth memory region (region 3), there are 4 chips (memory 943-1 through memory 943-4). The fourth memory region provides logical line addresses for bytes 9G-(13G-1), and may be interleaved with a fourth interleave factor ($IF_4=4$). The memories are coupled with the first through fourth memory channels.

In the first memory region, where $IF_1=2$, the logical address space and the physical address space start at the same line address. The channel map table has a length equal to $IF_1$ and its (CCF) entries are {1, 1}. This increases the UCA by one to obtain the PCA, so that instead of uncorrected channel addresses 0 and 1, system 900 uses physical channel addresses 1 and 2.

In the second memory region, where $IF_2=4$, equation (2) aligns the region relative address RRA with the start of the memory region. The channel map table has 4 entries: {0, 0, 0, 0}, which leaves the PCA unaltered from the UCA.

In the third memory region, where $IF_3=3$, there are 3 chips for a total of 3 GB. Equation (2) aligns the region relative address RRA with the start of the memory region. The channel map table has 3 entries: {0, 0, 0}, which again leaves the PCA unaltered from the UCA.

In the fourth region, where $IF_4=4$, there are again 4 chips for a total of 4 GB. The channel map table has 4 entries: {0, 0, 0, 0}, which once more leaves the PCA unaltered from the UCA.

The table 950 shows how the memory organization of system 900 can be stored in the configuration memories of memory interleaver 225. Table 950 prepares for a further explanation with respect to FIG. 10. For simplicity of explanation, it is assumed that each of the 1-GB memory chips has a line depth of only 3 lines.

The first memory region (region 0) has two memory chips: memory 940-2 and memory 940-3. Each memory chip stores 3 lines of data, so the two memory chips together store 6 lines of data, coinciding with logical line addresses 0 to 5. It follows that region 0 has RSA=0 and region 1 has RSA=6. The IF for region 0 is 2 (there are two chips). Because there are only two chips, the channel map has only two entries. The first memory channel is unused, skipped, so the channel address needs correction. As shown, CM-0 maps the uncorrected channel address 0 to the second memory channel, and CM_1 maps the uncorrected channel address 1 to the third memory channel.

The second memory region (region 1) has four memory chips: memory 941-1 to memory 941-4. Each memory chip stores 3 lines of data, so the four memory chips together store 12 lines of data, coinciding with logical line addresses 6 to 17. It follows that region 2 has RSA=18. The IF for region 1 is 4 (there are four chips). Because there are four chips, the channel map has four entries, that don't change the channel address.

The third memory region (region 2) has three memory chips: memory 942-1 to memory 942-3. Each memory chip stores 3 lines of data, so the three memory chips together store 9 lines of data, coinciding with logical line addresses 18 to 26. It follows that region 3 has RSA=27. The IF for region 1 is 3 (there are three chips). Because there are three chips, the channel map has three entries. But they don't correct anything since there are no skipped memory channels.

The fourth memory region (region 3) has four memory chips: memory 943-1 to memory 943-4. Each memory chip stores 3 lines of data, so the four memory chips together store 12 lines of data, coinciding with logical line addresses 27 to 38. It follows that the address space ends at LLA=38. The IF for region 3 is 4 (there are four chips). Because there are four chips, the channel map has four entries that don't correct anything since there are no skipped memory channels.

FIG. 10 shows a table 1000 detailing how an implementation translates logical line addresses for the four memory regions in FIG. 9. Again, for clarity of explanation, this example assumes the unrealistic memory chip line depth of 3. Table 1000 uses the memory architecture configuration stored in table 950. It lists successive logical line addresses (LLAs) 0 through 34 and signals that memory interleaver 225 creates in response, in accordance with FIG. 11.

For LLA values 0 through 5, circuit 1120 outputs the region index 0 (zero) and the region start address RSA also at 0 (zero). Subtractor 1130 calculates the region relative address RRA by subtracting the RSA from the LLA, resulting in RRA values 0 through 5. Second configuration memory 1140 outputs the IF, which equals 2 (two) for the first region. The device line address DLA, output by circuit 1150 which divides the RRA by the IF and rounds the result down, cycles through successive values 0, 1, and 2 with a cycle of 2 successive line addresses. The uncorrected channel address UCA, output by circuit 1160 which performs a modulo 2 operation (because IF=2), toggles between channels 0 and 1. Fourth configuration memory 1170 outputs the channel correction factor CCF as a function of the region (region 0) and the UCA, and third configuration memory 1180 corrects the UCA by adding the CCF to calculate the physical channel address PCA, which toggles between channels 1 and 2.

For LLA values 6 through 17, circuit 1120 outputs the region index 1 (one) and the region start address RSA also at 6 (six). Subtractor 1130 calculates the region relative address RRA by subtracting the RSA from the LLA, resulting in RRA values 0 through 11. Second configuration memory 1140 outputs the IF, which equals 4 (four) for the second region. The device line address DLA, output by circuit 1150 which divides the RRA by the IF and rounds the result down, cycles through successive values 0, 1, and 2 with a cycle of 4 successive line addresses. The uncorrected channel address UCA, output by circuit 1160 which performs a modulo 4 operation (because IF=4), cycles through channels 0 to 3. Fourth configuration memory 1170 outputs the channel correction factor CCF as a function of the region (region 1) and the UCA, and third configuration memory 1180 corrects the UCA by adding the CCF (which is 0) to calculate the physical channel address PCA, which also cycles through channels 0 to 3.

For LLA values 18 through 26, circuit 1120 outputs the region index 2 (two) and the region start address RSA also at 18. Subtractor 1130 calculates the region relative address RRA by subtracting the RSA from the LLA, resulting in RRA values 0 through 8. Second configuration memory 1140 outputs the IF, which equals 3 (three) for the third region. The device line address DLA, output by circuit 1150 which divides the RRA by the IF and rounds the result down, cycles through successive values 0, 1, and 2 with a cycle of 3 successive line addresses. The uncorrected channel address UCA, output by circuit 1160 which performs a modulo 3 operation (because IF=3), cycles through channels 0 to 2. Fourth configuration memory 1170 outputs the channel correction factor CCF as a function of the region (region 2) and the UCA, and third configuration memory 1180 corrects the UCA by adding the CCF (which is 0 because there are no skipped channels) to calculate the physical channel address PCA, which also cycles through channels 0 to 2.

For LLA values 27 through 34 (and onwards), circuit 1120 outputs the region index 3 (three) and the region start address RSA also at 27. Subtractor 1130 calculates the region relative address RRA by subtracting the RSA from the LLA, resulting in RRA values 0 through 7 (and onwards). Second configuration memory 1140 outputs the IF, which equals 4 (four) for the fourth region. The device line address DLA, output by circuit 1150 which divides the RRA by the IF and rounds the result down, cycles through successive values 0, 1, and 2 with a cycle of 4 successive line addresses. The uncorrected channel address UCA, output by circuit 1160 which performs a modulo 4 operation (because IF=4), cycles through channels 0 to 3. Fourth configuration memory 1170 outputs the channel correction factor CCF as a function of the region (region 1) and the UCA, and third configuration memory 1180 corrects the UCA by adding the CCF (which is 0) to calculate the physical channel address PCA, which also cycles through channels 0 to 3.

Although this example has assumed that all devices are the same size (i.e., have the same line width W and the same line depth), the simulation in FIG. 10 shows that different memory regions may have different line depths. As long as the region boundaries in table 950 (the first configuration memory) are correct, the circuit in FIG. 11 will function. Within one memory region, the line depth equals the line depth of the smallest memory device. The memory region ends where the line counts no longer match across the memory channels.

Figure 11:
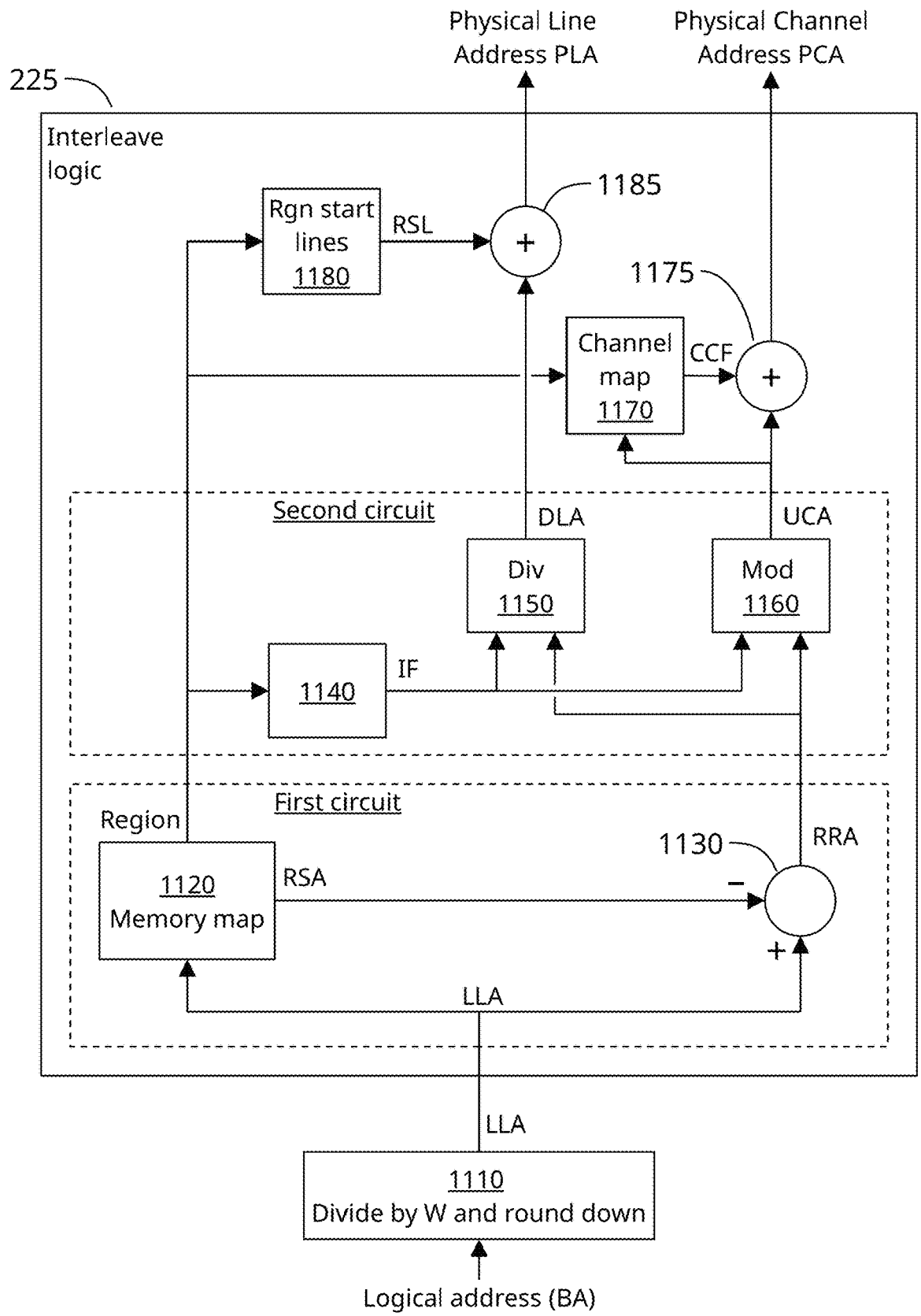
FIG. 11 illustrates another example implementation of the memory interleave logic.

FIG. 11 illustrates another example implementation of the memory interleaver 225. The implementation receives a byte address BA (a logical address) to determine a physical channel address PCA and a device line address DLA. Memory interleaver 225 may include divider 1110, which receives BA at its input, divides it by the channel width W, and rounds down the result to obtain a logical line address LLA according to formula (1) above. If W is a power of 2, divider 1110 may simply truncate $\log_2$ W bits from BA to obtain LLA.

A circuit 1120 stores memory region boundaries to determine the memory region from the LLA, for example by comparing the LLA with logical line addresses of the memory region boundaries (region start addresses) stored in a first configuration memory. On a first output, circuit 1120 outputs an index that indicates the memory region. For example, the index may be 0 (zero) for the first memory region, 1 (one) for the second memory region, 2 (two) for the third memory region, and so on. Circuit 1120 may include the first configuration memory and one or more comparators to compare the LLA with successive stored memory region borders. On a second output, circuit 1120 outputs the region start address RSA associated with the memory region found for the LLA.

A subtractor 1130 has a positive input coupled with the output of divider 1110 and a negative input coupled with the second output of circuit 1120 to calculate the RRA according to formula (2) above. A second configuration memory 1140 is coupled with the first output of circuit 1120 and uses the memory region as the address or index under which it stores the interleave factor IF associated with the memory region. Some implementations may combine second configuration memory 1140 with the first configuration memory included in circuit 1120, and provide circuit 1120 with a third output to output IP.

The output of second configuration memory 1140 (providing the IF) is coupled with a first input of circuit 1160 and a first input of circuit 1150. The output of subtractor 1130 (providing the RRA) is coupled with a second input of circuit 1160 and a second input of circuit 1150. Circuit 1160 performs the modulus operation of formula (3) above to obtain the UCA from the RRA and the IF, and circuit 1150 performs the division and round-down operation of formula (4) above to obtain the DLA from the RRA and the IF.

Memory interleaver 225 derives the PLA from the DLA by looking up a region start line RSL in third configuration memory 1180. It adds the region start line RSL to the device line address DLA in adder 1185 to obtain the physical line address PLA.

Implementations that don't correct for defective or missing memory devices may output the UCA as the physical channel address PCA. However, implementations that support skipping defective or missing memory devices comprise two more circuits to obtain the PCA from the region and the UCA.

A fourth configuration memory 1170 has two inputs to receive the region and UCA information. The first input is coupled with the output of circuit 1120 to receive the region index, and the second input is coupled with the output of circuit 1160 to receive the UCA. Based on the combination of region and UCA, fourth configuration memory 1170 outputs the CCF. An adder 1175, coupled with the outputs of fourth configuration memory 1170 and circuit 1160 adds the UCA and CCF to provide the PCA according to formula (5) above.

Figure 12:
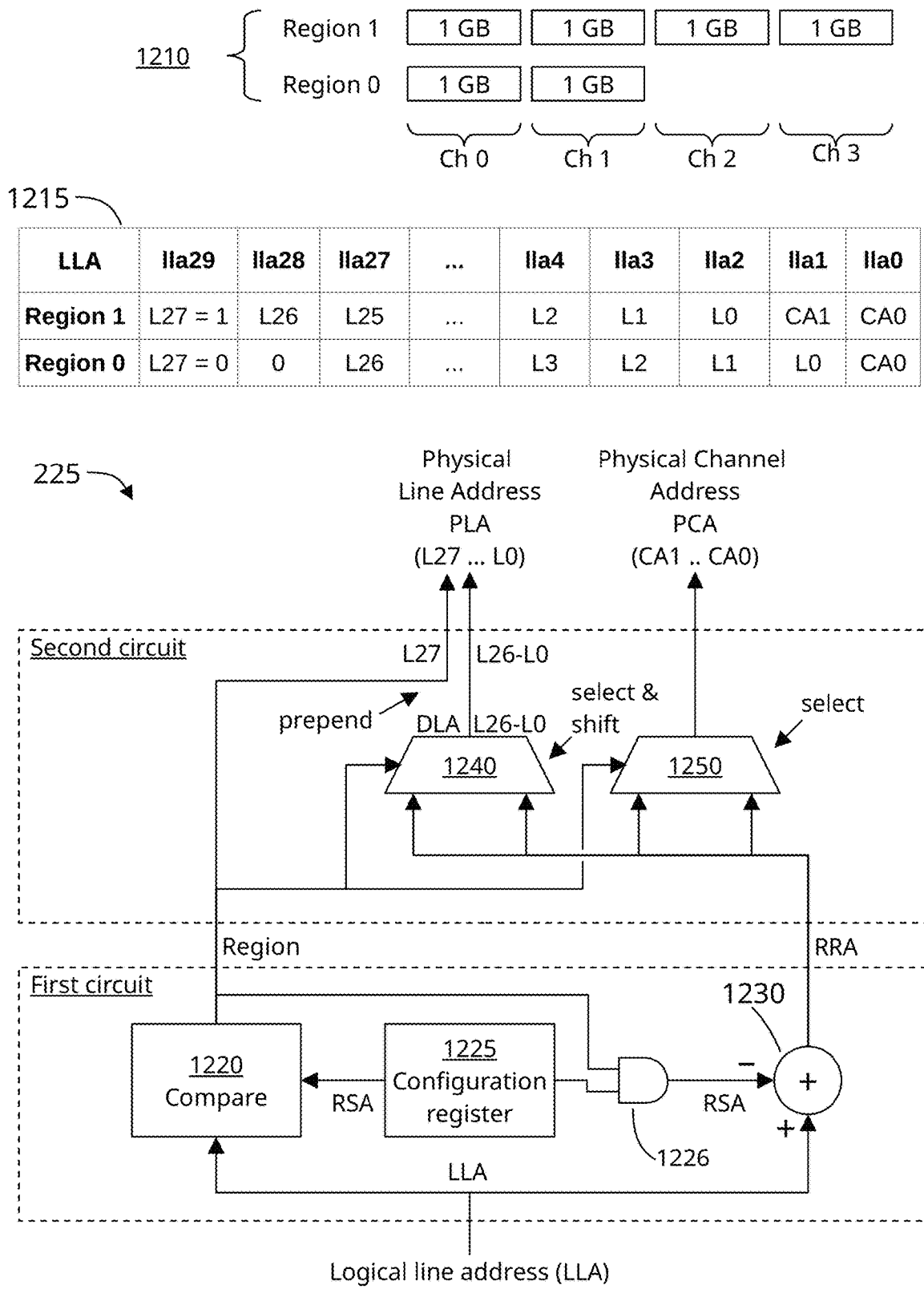
FIG. 12 illustrates a basic implementation of the memory interleave logic.

FIG. 12 illustrates a basic implementation of the memory interleave logic. The implementation is specific to the memory architecture 1210. There are several limitations for using this type of implementation. For example, the IF in each region must be a power of two (1, 2, 4, 8, etc.); the number of memory channels must be a power of two; and the line depth of each memory region must be a power of two. Flexibility in the memory architecture is limited, since the interleaver is hardwired for the target particular memory architecture. However, most of these limitations are not difficult to meet.

Memory architecture 1210 includes six 1-GB memory devices with a line width of 8 bytes. This means that every device stores $2^{27}$ data lines, requiring 27 address bits. To address 6 memory devices, an additional three bits are needed, for a total of 30 bits. Thus, the logical memory space is addressed with 30 bits, and each logical line address LLA includes 30 bits, shown as IIa29-IIa0. To address the memory region in memory architecture 1210, a one-bit region index is needed. In this case, it is not directly contained in the most significant bits in the LLA, but it can easily be derived. One possibility, as drawn, is to have a comparator 1220 that compares the LLA with the region start address RSA of region 1, which is stored in configuration register 1225. Since the implementation is specific to memory architecture 1210, configuration register 1225 does not need to be programmable—it can be hardwired. Another possibility, not drawn, is to use a combinational logic circuit instead of comparator 1220. The combinational logic circuit can perform a logic operation on the two most significant bits IIa29 and IIa28 to determine the region index. The combinational logic circuit does not need the full RSA, since in this case sufficient information is contained in bits IIa29 and IIa28.

Similarly, the implementation can calculate the RRA by subtracting all or part of the bits of the RSA from the LLA. Most bits in the RSA (for region 1) are zero. However, for region 0 all bits in the RSA are zero. A logic circuit 1226 (for example, one or more AND gates), enables a non-zero RSA when the region index is non-zero. The subtractor 1230 subtracts the RSA from the LLA to obtain the RRA.

The table 1215 shows how bits in the LLA can translate to address bits in the PLA and the PCA. Region 0, which has 2 available memory channels and interleaves with IF=2, requires that one least significant bit be used for interleaving, i.e., IIa0. Thus, bits IIa27-IIa1 can be used for the device line address DLA (denoted in table 1215 as bits L26-L0). To change the DLA into the PLA, the region index must be prepended. Region 1, which has 4 available memory channels and interleaves with IF=4, requires that two least significant bits be used for interleaving, i.e., IIa1 and IIa0. This leaves IIa28-IIa2 for the DLA.

According to table 1215, the bits for L26-L0 are differently positioned in the LLA for region 0 and region 1. Thus, to obtain the DLA, a bit shift needs to take place dependent on the region index. This is accomplished by multiplexer 1240, which in this case includes 27 one-bit multiplexers to select bits L26-L0 from the correct locations in the LLA. A smaller multiplexer 1250 selects the correct bits for the channel address. In this case, IIa0 always translates into CAO0, and IIa1 translates into CAO1 only for region 1. In region 0, CAO1 equals zero.

In this implementation, memory interleaver 225 derives the PLA by prepending bit L27 to bits L26-L0 of the DLA. Prepending bit L27 to the DLA amounts to adding the RSL to the DLA to obtain the PLA as in equation (6) above. In this case, the RSL would be bit L27, the region index bit, followed by 27 zeros. Since adding zeros requires no hardware, and the DLA has only 27 bits, prepending bit L27 is sufficient to implement an addition.

Considerations

We describe various implementations of a system and a method for memory interleaving.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above. For example, memories may not all be equally sized. Memories may not all be "left-aligned", i.e. starting population at the first channel. Memories may be "right-aligned", and the channel address calculation may be adapted accordingly. Although the examples all show a processor IC, an IC may not include a processor, but, for example, other circuits.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, or in a programmable logic device such as a field-programmable gate array (FPGA), obviating a need for at least part of the dedicated hardware. Implementations may be as a single chip, or as a multi-chip module (MCM) packaging multiple semiconductor dies in a single package. All such variations and modifications are to be considered within the ambit of the disclosed technology the nature of which is to be determined from the foregoing description.

Any suitable technology for manufacturing electronic devices can be used to implement the circuits of particular implementations, including CMOS, FinFET, Multi-Bridge-Channel FET (MBCFET), Gate-all-Around FET (GAAFET), BiCMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Although the physical processing of signals may be presented in a specific order, this order may be changed in different particular implementations. In some particular implementations, multiple elements, devices, or circuits shown as sequential in this specification can be operating in parallel.

Particular implementations may be implemented by using a coarse-grained reconfigurable array, application-specific integrated circuits, programmable logic devices, field-programmable gate arrays, optical, chemical, biological, quantum or nanoengineered systems, etc. Other components and mechanisms may be used. In general, the functions of particular implementations can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A processor comprising:
   processor logic and registers;
   multiple memory interfaces;
   a memory interleaver coupled with an output of the processor logic and registers and coupled with address inputs of each of the multiple memory interfaces, wherein:
   the memory interleaver controls access to the multiple memory interfaces using a physical channel address and a physical line address;
   the physical channel address selects one of the multiple memory interfaces;
   the physical line address selects a memory location in a memory device coupled with one of the multiple memory interfaces; and
   the memory interleaver includes:
   a first circuit configured to:
   determine a first memory region related to a first logical line address and output a first region signal associated with the first memory region; and
   determine a first region relative address from the first logical line address by subtracting a first region start address associated with the first memory region from the first logical line address; and
   a second circuit, coupled with a region signal output of the first circuit and a region relative address output of the first circuit, wherein the second circuit is configured to:
   determine a first interleave factor associated with the first memory region; and
   perform a division of the first region relative address by the first interleave factor to obtain a first device line address, and to perform a modulo operation on the first region relative address and the first interleave factor to obtain a first uncorrected channel address.

2. The processor of claim 1, wherein the memory interleaver further includes:
   a circuit to determine a first region start line associated with the first memory region, and to add the first region start line to the first device line address to obtain a first physical line address.

3. The processor of claim 1, wherein the memory interleaver further includes:
   a first configuration memory storing region boundary addresses associated with one or more memory regions and a comparator to compare a stored region boundary address with the first logical line address.

4. The processor of claim 1, wherein the memory interleaver further includes:
   a second configuration memory storing interleave factors associated with two or more memory regions.

5. The processor of claim 1, wherein the memory interleaver further includes:
   a circuit to add a first region start line, associated with the first memory region, to the first device line address to obtain and output the physical line address.

6. The processor of claim 2, wherein the memory interleaver further includes a third configuration memory storing region start lines associated with one or more memory regions.

7. The processor of claim 1, wherein the memory interleaver further includes:
   a fourth configuration memory storing channel maps associated with two or more memory regions and with two or more uncorrected channel addresses.

8. The processor of claim 7, wherein a channel map stores physical channel addresses.

9. The processor of claim 7, wherein a channel map stores channel correction factors.

10. The processor of claim 1, wherein:
    the first circuit comprises a first configuration memory to store region start addresses, coupled with a subtractor to subtract a first region start address from the first logical line address.

11. The processor of claim 1, wherein:
    the first circuit split bits of a logical line address signal into a region index bit group and a region relative address bit group.

12. The processor of claim 1, wherein the second circuit comprises:
    a second configuration memory to store interleave factors associated with two or more memory regions, wherein an address input of the second configuration memory is coupled with the region signal output of the first circuit, and an output of the second configuration memory is coupled with first inputs of a divider circuit and a modulo circuit, and wherein second inputs of the divider circuit and the modulo circuit are coupled with the region relative address output of the first circuit; and wherein the divider circuit has a device line address output and the modulo circuit has an uncorrected channel address output.

13. The processor of claim 1, wherein the second circuit comprises:
    a first multiplexer, controlled by a region signal from the region signal output, and configured to select one or more bits from the first region relative address to obtain the first device line address; and
    a second multiplexer, controlled by a region signal from the region signal output, and configured to select one or more bits from the first region relative address to obtain the first uncorrected channel address.

14. The processor of claim 1, further comprising:
multiple memories, coupled with the multiple memory interfaces, wherein one of the multiple memory interfaces is coupled with fewer memories than another one of the multiple memory interfaces.

15. The processor of claim 1, wherein the processor is reconfigurable.

16. The processor of claim 1, wherein the processor is a coarse-grained reconfigurable (CGR) processor.

* * * * *